Oct. 19, 1937.  M. GARBELL  2,096,508

PENDULUM SCALE

Filed July 5, 1935  5 Sheets-Sheet 1

Witness:
Martin H. Olsen.

Inventor:
Max Garbell.
By [signature], Atty.

Oct. 19, 1937. M. GARBELL 2,096,508
PENDULUM SCALE
Filed July 5, 1935 5 Sheets-Sheet 2

Inventor:
Max Garbell
Witness
Martin H. Olsen.
By Leo F. DuBois Atty

Oct. 19, 1937.  M. GARBELL  2,096,508
PENDULUM SCALE
Filed July 5, 1935  5 Sheets-Sheet 3
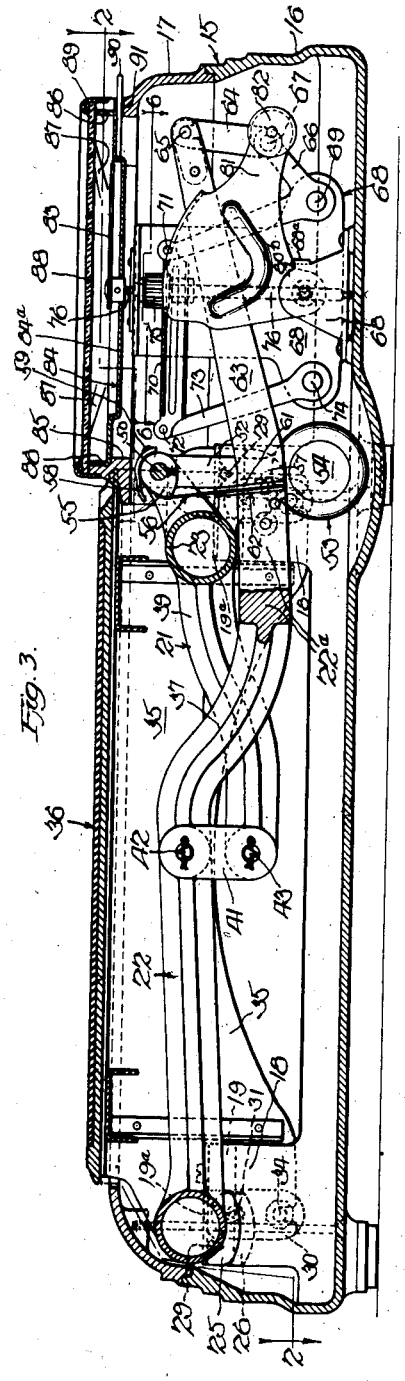
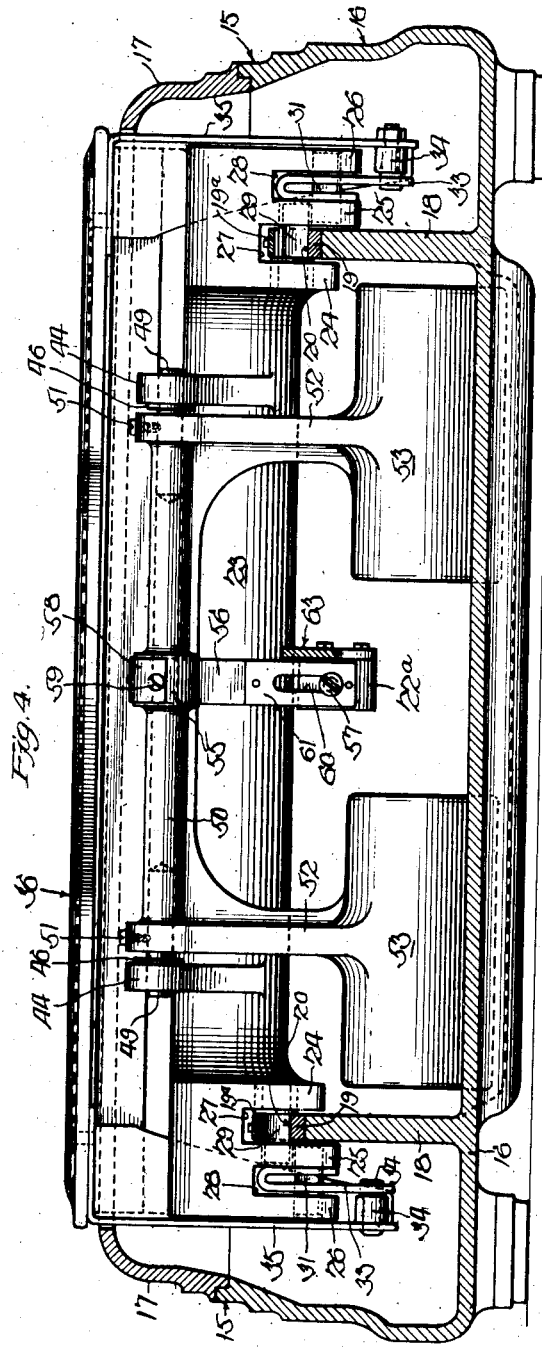
Witness
Martin H. Olsen
Inventor:
Max Garbell
By [signature] Atty.

Oct. 19, 1937.                M. GARBELL                2,096,508
                            PENDULUM SCALE
                        Filed July 5, 1935              5 Sheets-Sheet 4

Witness
Martin H. Olsen.

Inventor:
Max Garbell
By [signature] Atty.

Oct. 19, 1937. M. GARBELL 2,096,508
PENDULUM SCALE
Filed July 5, 1935 5 Sheets-Sheet 5
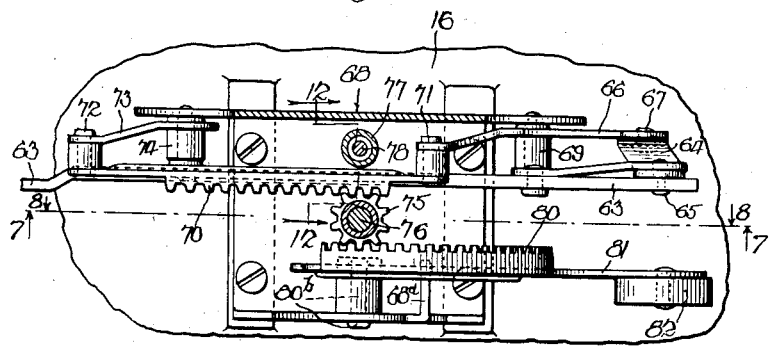
Inventor
Max Garbell Patented Oct. 19, 1937

2,096,508

UNITED STATES PATENT OFFICE 2,096,508

PENDULUM SCALE

Max Garbell, Chicago, Ill., assignor to Victor Adding Machine Company, Chicago, Ill., a corporation of Delaware Application July 5, 1935, Serial No. 29,860

5 Claims. (Cl. 265—62)

This invention relates in general to weighing scales and has more particular reference to the springless type of platform scales, especially those having a scale dial and built close to the floor for convenient use.

An important object of the invention is the provision of a springless platform scale that is shallow and which can be easily assembled and easily adjusted after assembling, which is efficient in operation and which can be economically manufactured.

A further object is the provision of novel counterbalancing means arranged and constructed in such manner that its weight is carried directly on the pivotal center of the platform-supporting means.

And a further object is the provision of novel indicating mechanism coacting with the platform-supporting means and under the control of counterbalancing means to insure the accurate recording of a weight placed on the platform.

Various other objects and advantages will be obvious from the following description embodying the invention, or from an inspection of the accompanying drawings; and the invention constitutes certain new and novel features of construction and combination of parts hereinafter set forth and claimed.

Referring to the drawings:

Figure 3 is a longitudinal sectional view taken on the line 3—3 of Figure 2.

Figure 4 is an enlarged cross-sectional view taken on the line 4—4 of Figure 2.

Figure 6 is an enlarged detail plan sectional view taken on the line 6—6 of Figure 3.

Figure 7 is an enlarged detail vertical sectional view taken on the line 7—7 of Figure 6.

Figure 8 is an enlarged detail view showing the indicator restoring means taken on the line 8—8 of Figure 6.

Figure 9 is an enlarged detail view taken through the pendent supporting bearing substantially on the line 9—9 of Figure 2.

Figure 10 is an enlarged fragmentary detail perspective view of the dial and frictional means contacting the glass thereof.

Figure 11 is an enlarged detail cross-sectional view of the equalizer-bearing means and the platform-supporting means.

Figure 12 is an enlarged detail cross-sectional view of an adjustable rack guide taken on the line 12—12 of Figure 6.

Figure 1:
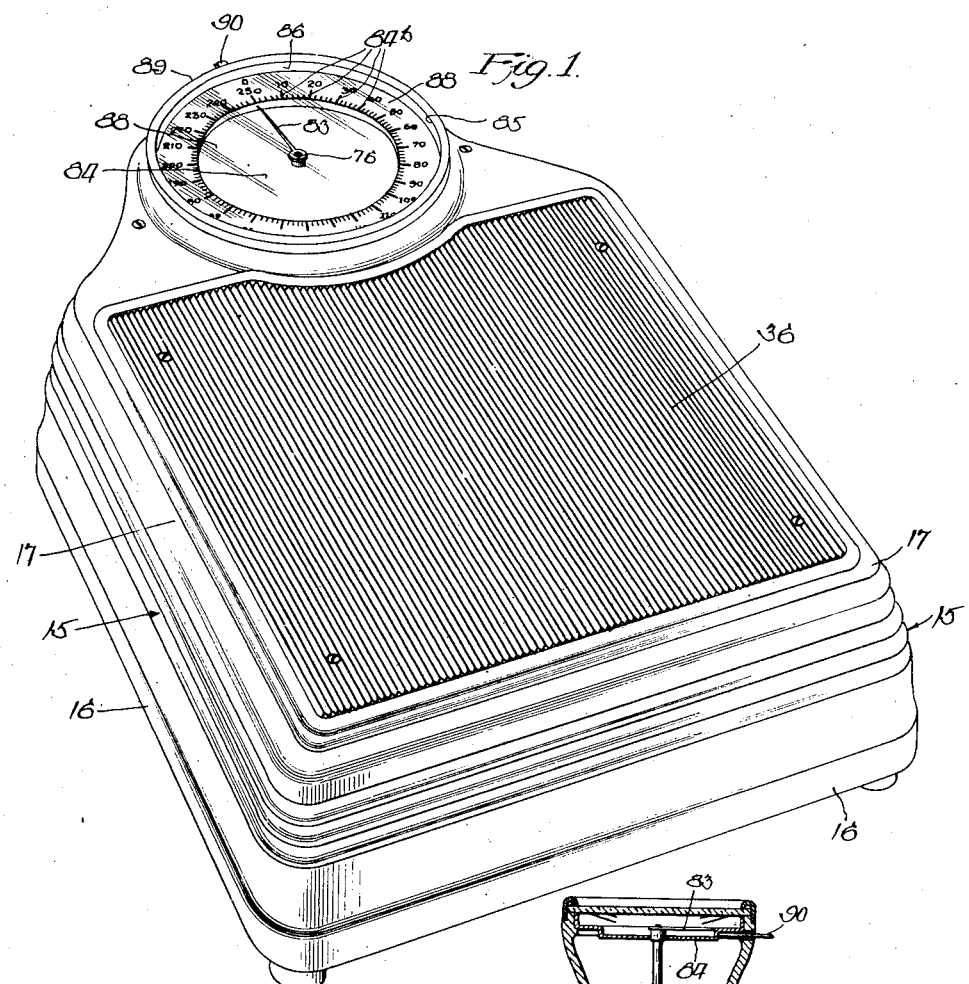
Figure 1 is a perspective view of a scale embodying my invention.

The reference numeral 15 designates the scale housing which is constructed of two halves comprising a base 16 and a top portion 17. The base 16 carries the upwardly extending portions 18, which may be an integral part thereof or attached thereto, and are arranged in pairs, being each provided at their upper end portions with a horizontally extending hardened member 19 that is provided with a V-notch 20 in its top surface which forms the pivotal centers for a pair of opposed equalizer members 21 and 22. The equalizer member 21 has a transversely extending integral portion 23 that overlies and extends outwardly on each side of the extending portions 18 of the base, and is provided on its under side with depending flanges 24, 25 and 26, respectively, which form guide openings 27 and 28, respectively. A transverse pivotal pin 29, preferably of V-formation, is positioned between the flanges 24 and 25 in an opening 30 therein, and serves as a pivotal center to engage the V-shaped notch of the hardened member 19 to permit rocking movement of the equalizer member 21 thereon. A plate 19ª is secured to the member 19 and retains the pivotal pin 29 of the equalizer in position in the V-notch 30 therein. Positioned between the flanges 25 and 26 and inwardly of the pivotal center 29 and transversely of the opening 28 is a V-shaped pin 31 which extends through the opening 32 in these flanges and serves to support a depending link 33 thereon that is provided at its lower end portion with a pivotal pin 34 which extends outwardly thereof and to which a flange 35 is attached. The flange 35 is secured to the under side of the platform 36 and when attached to the link 33 serves to support the platform in suspended position on the equalizer 21.

The equalizer 22 is supported on the other pair of uprights 18 of the base 16 in the same manner as the equalizer 21, and it is thought that a description of one will suffice for a description of all. The equalizers are preferably of U-formation, each having a pair of inwardly directed arms 37, 38, respectively, and 39 and 40, respectively, which are directed toward each other and arranged in superposed relation, being connected for uniform movement with each other intermediate their pivotal centers 29 by means of the links 41 which have the pins 42 and 43, respectively, fixed to the arms and extending through the links.

The arms 37 and 38 of the equalizer 22 converge and are joined to extend below the transversely extending portion 23 of the equalizer 21 and connect the indicating mechanism to actuate the same upon the movement of the equalizer, which will be more fully explained with the operation of the device.

The transversely extending portion 23 of the equalizer 21 is provided with spaced-apart, outwardly-directed lugs 44, which are each provided with a transverse bore 45 adapted to receive a bushing 46 which forms a ball race for a plurality of ball bearings 47 carried in an annular groove 48 in a hardened stud 49 that is fixed in a weight-carrying frame 50 by means of the set screws 51. The frame 50 is provided with depending arms 52 that have the integral tubular portions 53 at their free ends and which are filled with a substance 54 and serve as dependent weights on the arms 52. Intermediate the lugs 44, the frame 50 is provided with a cam 55 on which is secured a flexible band 56 which has its other end extending downwardly and slidably connected to the outwardly extending portion 22ᵃ of the converging arms 37 and 38 of the equalizer 22 by means of the screw 57. The flexible band 56 is secured to the cam 55 by means of an arcuate member 58 and is securely held in position therewith by means of a screw 59. The downwardly extending end of the flexible band 56 is provided with an elongated opening 60 and has the plates 61 and 62, respectively, fixed to each face thereof, which are also provided with elongated openings that are aligned with the opening 60 and through which the screw 57 freely extends and serves as a loose connection in one direction of movement of the equalizer 22. The plates 61 and 62 also serve to retain the flexible band 56 in aligned relation with the cam 55 and to support the same so that it will not buckle during the operation of the device and when transporting the same.

As thus far described, it will be noted that the weight of a load placed on the platform will be transmitted to the depending flanges 35 fixed thereto and to the links 33 and the equalizers 21 and 22 and cause a rocking movement thereof. The rocking movement of the equalizers causes a swinging movement of the lugs 44 carried on the equalizer 21 and bodily carries the weights 53 therewith. The extending portion 22ᵃ of the equalizer 22 rocks downwardly, and this downward movement causes a pull on the flexible band 56 which causes a turning movement of the cam 55 and a rocking movement of the integral frame 50 with the dependent weights 53 carried thereon. These weights 53 serve to counterbalance the weight of a load placed on the platform 36, and in the manner they are operably connected therewith, a very slight downward movement of the platform causes a relatively longer swinging movement of the weights.

The portion 22ᵃ of the equalizer 22 has an arm 63 fixed thereto that extends outwardly of the transversely extending portion 23 of the equalizer 21 and has its free end portion connected to a link 64 by means of a pin 65, and the other end of said link is connected to a bell crank member 66 by means of a pin 67. The bell crank member 66 is pivotally carried for rocking movement on a U-shaped bracket 68 by means of a stud 69, and has its other leg pivotally connected to a floating rack 70 by means of a pin 71. The floating rack 70 is pivotally connected at 72 to a link 73 that is pivotally carried on the U-shaped bracket 68 by means of a stud 74 and forms means for a parallel movement of the rack 70 with the bell crank 66. The rack 70 is in meshing engagement with a pinion gear 75 that is fixed to a vertically disposed shaft 76 pivotally carried in the bracket 68, and the rack 70 is normally held in meshing engagement with the pinion gear 75 by means of an adjustable member 77. The member 77 is adjustably secured to the bracket 68 by means of a screw 78 and nut 79 which clamps the member 77 in position.

The pinion gear 75 is also in meshing engagement with a gear sector 80 that is pivotally carried on a stud 80ᵃ fixed to the bracket 68 and is provided with an integral extension 81 on one side thereof that has a counterbalancing weight 82 fixed thereto and which serves to maintain a tension on the pinion gear 75 for taking up the lost motion therebetween and the rack 70. The sector 80 is provided with a shoulder 80ᵇ which is normally spaced from an inwardly turned ear 68ᵃ on the bracket 68 and which serves as a limit stop for the sector to release the strain on the pinion gear 75 when the device is subjected to jolts while transporting the same.

The vertical shaft 76 extends upwardly through the bracket 68 and has an indicator hand 83 fixed thereto which overlies a dial 84 supported on the upper portion of the housing 17 in an opening 85 therein. The dial 84 is of cup formation having a peripheral flange 86 which is provided with a plurality of sheared and formed portions 87 that offer a frictional resistance to its turning movements and which also serves to contact a glass plate 88 positioned over the dial in the opening 85 of the housing and retained therein by means of a ring 89. The dial 84 is provided with a handle 90 fixed thereto that extends outwardly of the housing 17 through a slot opening 91 therein, which serves to manually turn the dial to adjust the same to the zero position with respect to the indicator 83. The dial is provided with a depressed central portion 84ᵃ into which the indicator 83 is adapted to freely turn with its top surface in the plane of the surface adjacent the peripheral flange 86 and which is provided with a series of indicating lines 84ᵇ.

It will be noted that the indicating mechanism above described is permanently connected with the arm 63 of the equalizing means, and the adjustments therein are obtained merely by turning the dial 84 by means of the handle 90, so as to set the zero position of the dial to register with the indicator.

As a load is placed upon the platform 36, the equalizers will be caused to rock downward on their pivotal centers 29, and the flexible connection 56 will exert a pulling strain on the cam 55 and will cause a rocking movement thereof with the frame 50 on the lugs 44 and an outward swinging movement of the weights 53 therewith. The extension 63 will be carried simultaneously with the equalizers and actuate the parallel connection formed by the bell crank 66 and the link 73 for bodily carrying the rack 70 therewith to rotate the pinion gear 75 and adjust the indicator to record the weight on the dial.

Figure 13:
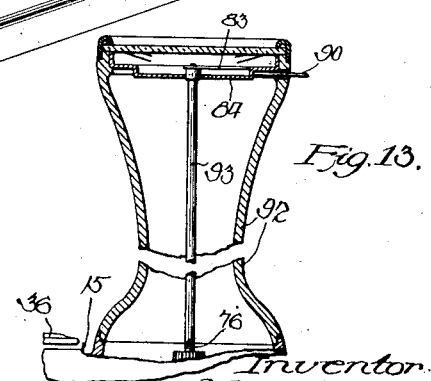
Figure 13 is a vertical detail sectional view illustrating an extension member for raising the dial above the platform.
Figure 2:
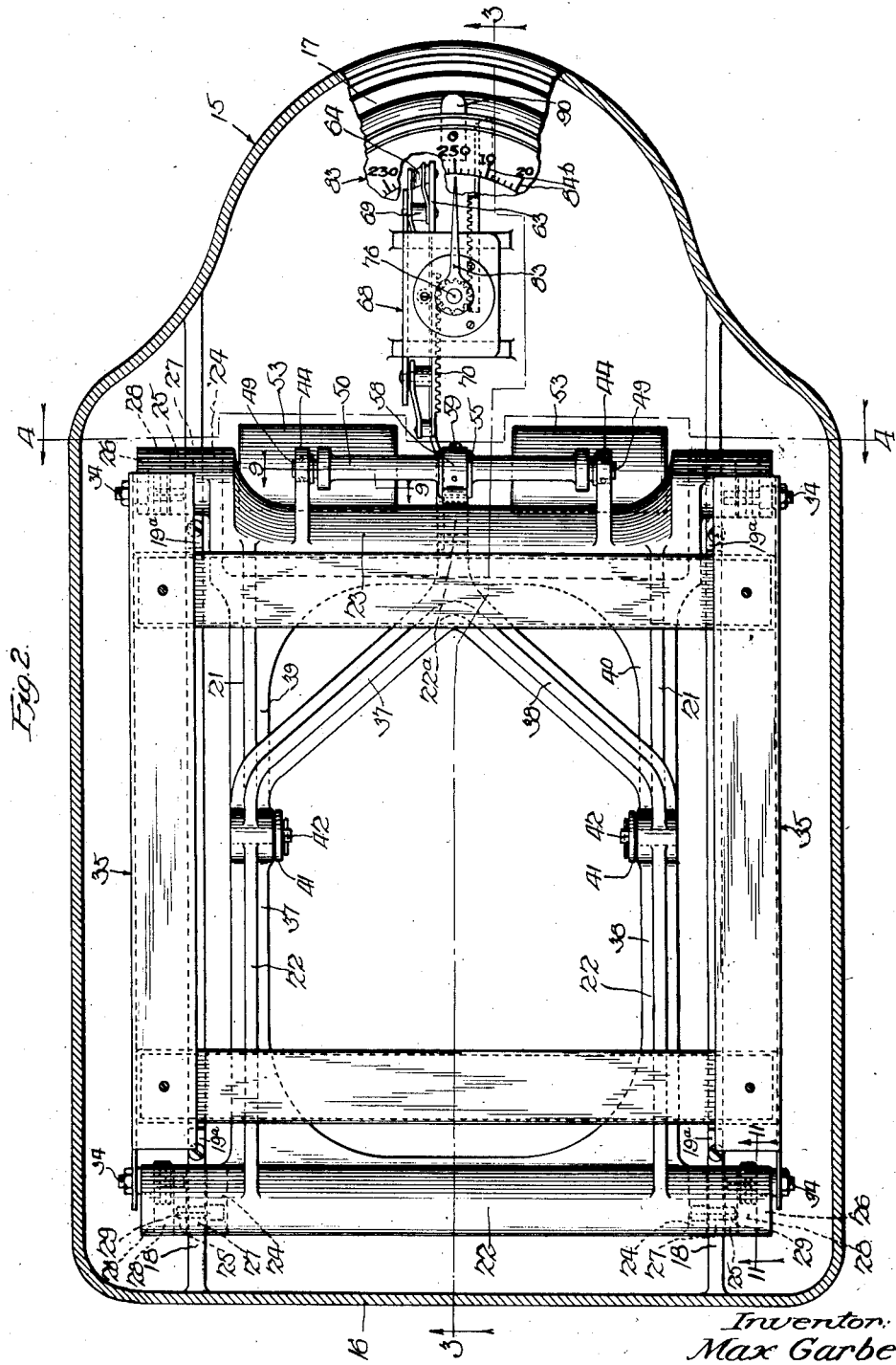
Figure 2 is a plan sectional view taken substantially on the line 2—2 of Figure 3.
Figure 5:
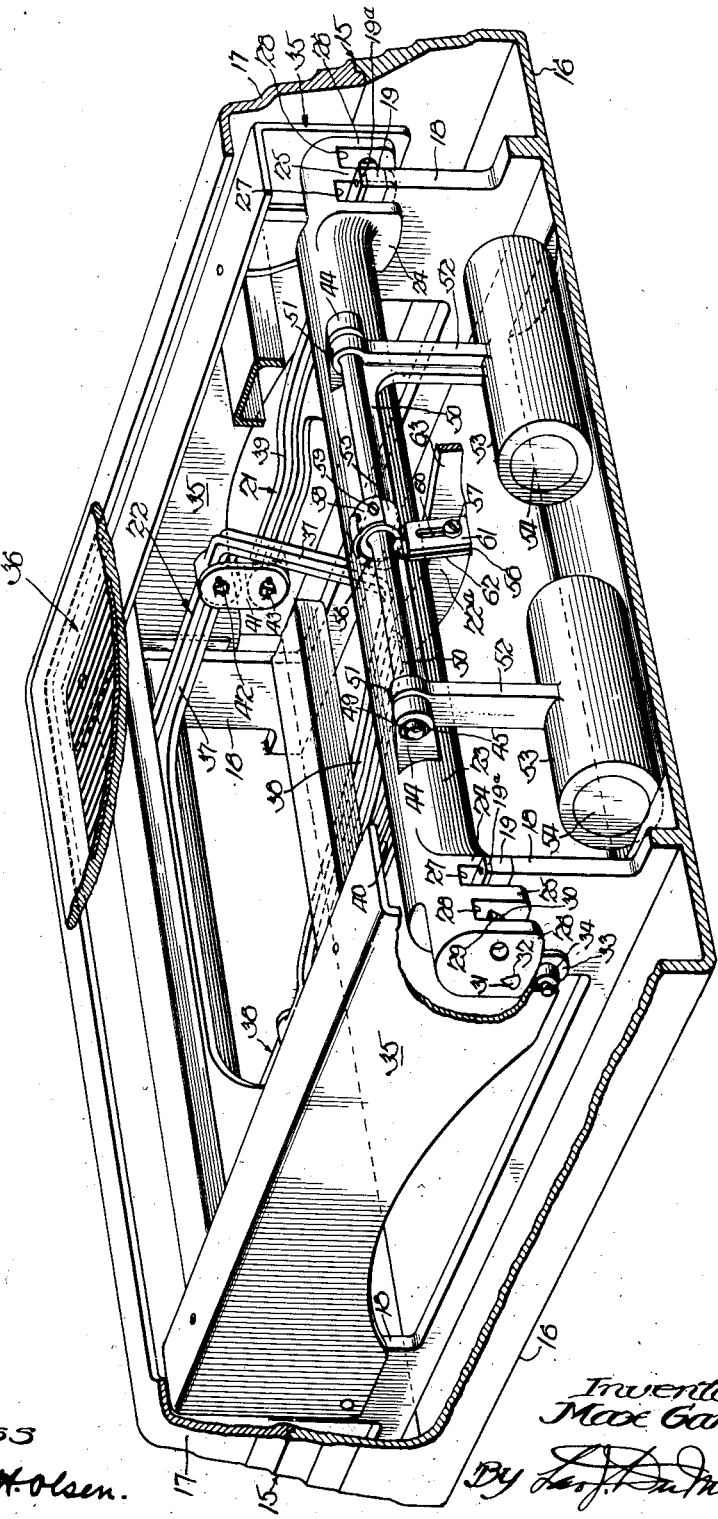
Figure 5 is a detail perspective view of the scale showing portions of the platform and housing broken away to illustrate the mechanism below the platform.

In Figure 13, the dial 84 is shown as being raised some distance above the base and has an extension member 92 which is fitted to the housing 15 and supports the dial. A shaft 93 is fixed to the shaft 76 and has the indicator 83 fixed to the upper end thereof which coacts with the dial in the manner as above described.

I claim:

1. In a scale of the character described, in combination, a base, an indicator, a weighing platform and means for actuating the indicator in response to a load placed on the platform, said means comprising a pair of members pivotally carried in opposed relation on the base and connected for movement with each other, weight means coacting with one of said members and operatively connected to the other of said members for movement therewith in one direction, said connection comprising a flexible band having an opening therein permitting of a free movement thereof in one direction of movement of said pair of members and for a positive connection in their other direction of movement.

2. In a scale of the character described, in combination, a base, a pair of oppositely directed members pivotally carried on the base and connected intermediate their pivotal centers for rocking movement with each other, a platform carried on the pair of members, a pendulum mounted on one of said members, means flexibly connecting the pendulum with the other of said members whereby the pendulum coacts with both of said members, and indicating means operatively connected with one of said members.

3. In a scale of the character described, in combination, a base, a pair of oppositely directed members pivotally carried for rocking movements on the base and connected intermediate their pivotal centers for rocking movement with each other, a platform carried on the pair of members, a pendulum mounted on one of said members, a cam carried by said pendulum, means flexibly connecting the cam with the other of said members whereby the pendulum coacts with both of said members, and indicating mechanism operatively connected with said last-mentioned member, the rocking of the members moving said cam to move the pendulum, said pendulum forming means for counterbalancing a load placed on the platform to be recorded by said indicating mechanism.

4. In a scale of the character described, in combination, a base, a pair of members pivotally carried for rocking movement in opposed relation on the base and connected intermediate their pivotal centers for rocking movement with each other, a platform carried on the pair of members, a pendulum mounted on one of said members, means flexibly connecting the pendulum with the other of said members whereby the pendulum coacts with both of said members, an indicator and means to move the indicator in response to the movement of said members, one of said members having a link and said means having a pair of links forming a parallel motion device connected to said link, whereby the motion is transmitted from the member to the parallel motion device to actuate the indicator.

5. In a scale of the character described, in combination, a base, an indicator having a driving gear thereon, a weighing platform and means for actuating the indicator in response to a load placed on the platform, said means comprising a pair of members pivotally carried in opposed relation on the base and connected for movement with each other, a platform carried on the pair of members, a pendulum mounted on one of said members, means flexibly connecting the pendulum with the other of said members whereby the pendulum coacts with both of said members, and a pair of links supporting a rack and forming a parallel motion device operatively connected with the driving gear to move the indicator and operatively connected with one of said members.

MAX GARBELL.